US012317106B2

(12) United States Patent
Chen

(10) Patent No.: US 12,317,106 B2
(45) Date of Patent: May 27, 2025

(54) PROCESSING METHOD FOR TERMINAL MEASUREMENT AND TERMINAL

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 390 days.

(21) Appl. No.: 17/402,204

(22) Filed: Aug. 13, 2021

(65) Prior Publication Data

US 2021/0377765 A1    Dec. 2, 2021

Related U.S. Application Data

(63) Continuation of application No. PCT/CN2020/075282, filed on Feb. 14, 2020.

(30) Foreign Application Priority Data

Feb. 14, 2019   (CN) .......................... 201910115159.0

(51) Int. Cl.
 H04W 24/08       (2009.01)
 H04W 48/20       (2009.01)
 H04W 52/02       (2009.01)
(52) U.S. Cl.
 CPC ........... *H04W 24/08* (2013.01); *H04W 48/20* (2013.01); *H04W 52/0209* (2013.01)
(58) Field of Classification Search
 CPC . H04W 24/08; H04W 48/20; H04W 52/0209; H04W 48/16; H04W 52/0229;

(Continued)

(56) References Cited

U.S. PATENT DOCUMENTS 9,439,170 B2 *   9/2016   Kazmi ................. H04W 72/02
2010/0041412 A1   2/2010   Yu (Continued)

FOREIGN PATENT DOCUMENTS

CN         10296459 A      10/2008
CN         101299860 A     11/2008

(Continued)

OTHER PUBLICATIONS

Japanese Office Action related to Application No. 2021-546736 reported on Jul. 27, 2022.

(Continued)

*Primary Examiner* — Jung Liu
(74) *Attorney, Agent, or Firm* — von Briesen & Roper, s.c.

(57) ABSTRACT

The present disclosure provides a processing method for terminal measurement and a terminal. The processing method includes: receiving a first indication; performing a first operation based on the first indication, where the first operation includes one of the following: if it is determined, based on the first indication, that measurement needs to be performed, performing measurement on a measurement object to obtain a measurement result; if it is determined, based on the first indication, that no measurement needs to be performed, skipping performing measurement is performed; determining a measurement object based on the first indication, and performing measurement on the measurement object to obtain a measurement result; or if it is determined, based on the first indication, that measurement needs to be performed, determining a measurement object based on the first indication, and performing measurement on the measurement object to obtain a measurement result.

20 Claims, 5 Drawing Sheets

(58) Field of Classification Search
CPC ............. H04W 24/02; H04W 36/0083; H04W 52/0212; H04B 17/382; Y02D 30/70
See application file for complete search history.

(56) References Cited

U.S. PATENT DOCUMENTS

| | | | | |
|---|---|---|---|---|
| 2012/0327883 | A1* | 12/2012 | Yang | H04W 74/0833 370/329 |
| 2015/0011216 | A1* | 1/2015 | Jung | H04W 36/0072 455/436 |
| 2017/0245168 | A1 | 8/2017 | Yi | |
| 2017/0294977 | A1 | 10/2017 | Uchino et al. | |
| 2018/0054725 | A1* | 2/2018 | Agiwal | H04W 88/08 |
| 2018/0076924 | A1 | 3/2018 | Lee et al. | |
| 2018/0206214 | A1* | 7/2018 | Bendlin | H04L 5/0053 |
| 2019/0223212 | A1* | 7/2019 | Xiao | H04W 74/0833 |
| 2019/0320355 | A1* | 10/2019 | Da Silva | H04L 41/0668 |
| 2020/0205218 | A1* | 6/2020 | Tang | H04W 72/0466 |
| 2021/0160749 | A1* | 5/2021 | Lu | H04W 36/00 |

FOREIGN PATENT DOCUMENTS

| | | |
|---|---|---|
| CN | 102281556 A | 12/2011 |
| CN | 102448100 A | 5/2012 |
| CN | 108513722 A | 9/2018 |
| EP | 1950991 A1 | 7/2008 |
| EP | 3920577 A1 | 8/2021 |
| JP | 2018512013 A | 4/2018 |
| WO | 2012148229 A2 | 11/2012 |

OTHER PUBLICATIONS

Samsung, "Discussion on s-Measure Considering NR-SS and CSI-RS" May 15 to 19, 2017, 3GPP TSG RAN WG2 #98, Agenda Item: 10.4.1.4, Hangzhou, China, R2-1705598.
CMCC, "SUL impact on cell selection and reselection" Jan. 22 to 26, 2018, 3GPP TSG-RAN WG2 NR ad hoc 1801, Agenda Item: 10.2.6, Vancouver, Canada, R2-1801289.
Tdoc R2-1803607; 3GPP TSG-RAN WG2 #100; CA Measurments in Idle; Discussion and Decision, Ericsson; Athens, Greeece, Feb. 26-Mar. 2, 2018.
R2-1805849; 3GPP TSG-RAN WG2 NR #101B Meeting; RRM measurement configuration for BWP; Discussion and Decision; Samsung; Sanya, China; Apr. 16-20, 2018.
Office Action from Chinese Patent Office dated May 20, 2021, in related application 201910115159.0.
International Search Report dated Aug. 26, 2021 regarding related application PCT/CN2020/075282, filed Feb. 14, 2020.
Extended European search report related to Application No. 20756518.5 reported on Apr. 4, 2022.
"5G; NR; Radio Resource Control (RRC); Protocol specification (3GPP TS 38.331 Version 15.3.0 Release 15)", Etsi Technical Specification, European Telecommunications Standards Institute (Etsi), 650, Route Des Lucioles; F-06921 Sophia-Antipolis; France.

* cited by examiner

PROCESSING METHOD FOR TERMINAL MEASUREMENT AND TERMINAL

CROSS-REFERENCE TO RELATED APPLICATIONS

This application is a continuation application of International Application No. PCT/CN2020/075282 filed on Feb. 14, 2020, which claims priority to Chinese Patent Application No. 201910115159.0 filed in China on Feb. 14, 2019, which is incorporated herein by reference in its entirety.

TECHNICAL FIELD

Embodiments of the present disclosure relate to the field of wireless communications technologies, and in particular, to a processing method for terminal measurement and a terminal.

BACKGROUND

In deployment of a current 5G network, when a terminal needs to perform cell measurement, cells of a plurality of frequencies (for example, a 3.5 GHz frequency and a 2.6 GHz frequency) may need to be measured, and then related operations are performed based on measurement results of different-frequency cells, for example, cell selection or reselection is performed. If cells of all frequencies need to be measured each time, power consumption of the terminal inevitably increases.

SUMMARY

Embodiments of the present disclosure provide a processing method for terminal measurement and a terminal, to solve a problem of high power consumption of a terminal because cells of all frequencies need to be measured for each measurement.

To solve the foregoing problem, the present disclosure is implemented as follows.

According to a first aspect, an embodiment of the present disclosure provides a processing method for terminal measurement, including:
  receiving a first indication; and
  performing a first operation based on the first indication, where the first operation includes one of the following:
  if it is determined, based on the first indication, that measurement needs to be performed, performing measurement on a measurement object to obtain a measurement result;
  if it is determined, based on the first indication, that no measurement needs to be performed, skipping performing measurement;
  determining a measurement object based on the first indication, and performing measurement on the measurement object to obtain a measurement result; or
  if it is determined, based on the first indication, that measurement needs to be performed, determining a measurement object based on the first indication, and performing measurement on the measurement object to obtain a measurement result.

According to a second aspect, an embodiment of the present disclosure provides a terminal, including:
  a receiving module, configured to receive a first indication; and
  a processing module, configured to perform a first operation based on the first indication, where the first operation includes one of the following:
  if it is determined, based on the first indication, that measurement needs to be performed, performing measurement on a measurement object to obtain a measurement result;
  if it is determined, based on the first indication, that no measurement needs to be performed, skipping performing measurement;
  determining a measurement object based on the first indication, and performing measurement on the measurement object to obtain a measurement result; or
  if it is determined, based on the first indication, that measurement needs to be performed, determining a measurement object based on the first indication, and performing measurement on the measurement object to obtain a measurement result.

According to a third aspect, an embodiment of the present disclosure provides a terminal, including: a processor, a memory, and a computer program stored in the memory and executable on the processor. The computer program, when executed by the processor, implements the steps of the foregoing processing method for terminal measurement.

According to a fourth aspect, an embodiment of the present disclosure provides a computer-readable storage medium. The computer-readable storage medium stores a computer program. The computer program, when executed by a processor, implements the steps of the foregoing processing method for terminal measurement.

In the embodiments of the present disclosure, whether measurement needs to be performed is determined based on the received first indication. When no measurement needs to be performed, measurement is not performed to save power consumption of the terminal, or the measurement object is determined based on the first indication and measurement is performed only on the determined measurement object instead of all frequencies, to save power consumption of the terminal.

BRIEF DESCRIPTION OF DRAWINGS

With reference to detailed descriptions in preferable implementations in the following descriptions, various other advantages and benefits become clear to a person of ordinary skills in the art. The accompanying drawings are merely used to show the preferable implementations, and are not considered as limitations to the present disclosure. In addition, in all the accompanying drawings, same reference numerals are used to indicate the same component. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any of its other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be specific, use of the word "exemplary" or "example" or the like is intended to present a related concept in a specific manner.

The following describes the embodiments of the present disclosure with reference to the accompanying drawings. A processing method for terminal measurement and a terminal provided in the embodiments of the present disclosure can be applied to a wireless communications system. The wireless communications system may use a 5G system or an evolved long term evolution (evolved Long Term Evolution, eLTE) system or a subsequent evolved communications system.

Figure 1:
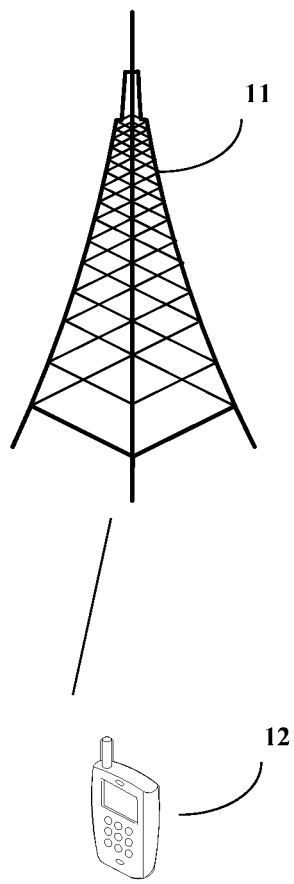
FIG. 1 is a schematic architectural diagram of a wireless communications system according to an embodiment of the present disclosure.

FIG. 1 is a schematic architectural diagram of a wireless communications system according to an embodiment of the present disclosure. As shown in FIG. 1, the wireless communications system may include a network side device 11 and a terminal 12. The terminal 12 may be connected to the network side device 11. In practical application, a connection between the foregoing devices may be a wireless connection. In order to conveniently and intuitively indicate a connection relationship between the devices, a solid line is used for representation in FIG. 1.

It should be noted that the foregoing communications system may include a plurality of terminals 12, and the network side device 11 may communicate (perform signaling transmission or data transmission) with the plurality of terminals 12.

The network side device 11 provided in this embodiment of the present disclosure may be a base station, and the base station may be a commonly used base station, or may be an evolved nodeB (evolved node base station, eNB), or may be a device such as a network side device (for example, a next generation nodeB (next generation node base station, gNB) or a transmission and reception point (transmission and reception point, TRP)) or a cell in a 5G system, or may be a network side device in a subsequent evolved communications system.

The terminal 12 provided in this embodiment of the present disclosure may be a mobile phone, a tablet computer, a laptop, an ultra-mobile personal computer (Ultra-Mobile Personal Computer, UMPC), a netbook, a personal digital assistant (Personal Digital Assistant, PDA), or the like.

Figure 2:
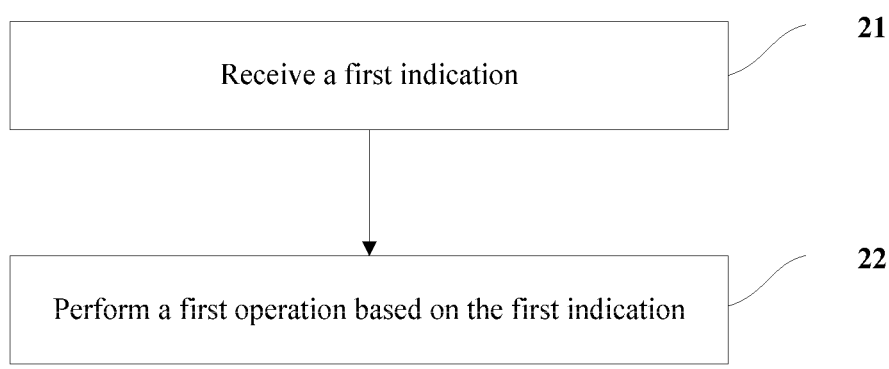
FIG. 2 is a schematic flowchart of a processing method for terminal measurement according to Embodiment 1 of the present disclosure.

Refer to FIG. 2. FIG. 2 is a schematic flowchart of a processing method for terminal measurement according to Embodiment 1 of the present disclosure. The processing method is applied to a terminal, and includes the following.

Step 21: Receive a first indication.

In this embodiment of the present disclosure, the terminal receives the first indication sent by a network side device. The network side device may be the network side device in the embodiment shown in FIG. 1.

Step 22: Perform a first operation based on the first indication, where the first operation includes one of the following:

(1) if it is determined, based on the first indication, that measurement needs to be performed, performing measurement on a measurement object to obtain a measurement result;

(2) if it is determined, based on the first indication, that no measurement needs to be performed, skipping performing measurement;

(3) determining a measurement object based on the first indication, and performing measurement on the measurement object to obtain a measurement result; or (4) if it is determined, based on the first indication, that measurement needs to be performed, determining a measurement object based on the first indication, and performing measurement on the measurement object to obtain a measurement result.

In this embodiment of the present disclosure, optionally, when the terminal is in an idle state (idle) or an inactive state (inactive), the terminal performs the first operation based on the first indication.

To be specific, in some embodiments, when the terminal is in the idle state or inactive state, the performing the first operation based on the first indication includes: if it is determined, based on the first indication, that measurement needs to be performed, performing measurement on a measurement object to obtain a measurement result.

In some embodiments, when the terminal is in the idle state or inactive state, the performing the first operation based on the first indication includes: if it is determined, based on the first indication, that no measurement needs to be performed, skipping performing measurement.

In some embodiments, when the terminal is in the idle state or inactive state, the performing the first operation based on the first indication includes: if a measurement object is determined based on the first indication, performing measurement on the measurement object to obtain a measurement result.

In some embodiments, when the terminal is in the idle state or inactive state, the performing the first operation based on the first indication includes: if it is determined, based on the first indication, that measurement needs to be performed, determining a measurement object based on the first indication, and performing measurement on the measurement object to obtain a measurement result.

After the measurement result is obtained by performing measurement on the measurement object as described above, an operation such as cell selection or reselection may further be performed based on the measurement result.

Figure 3:
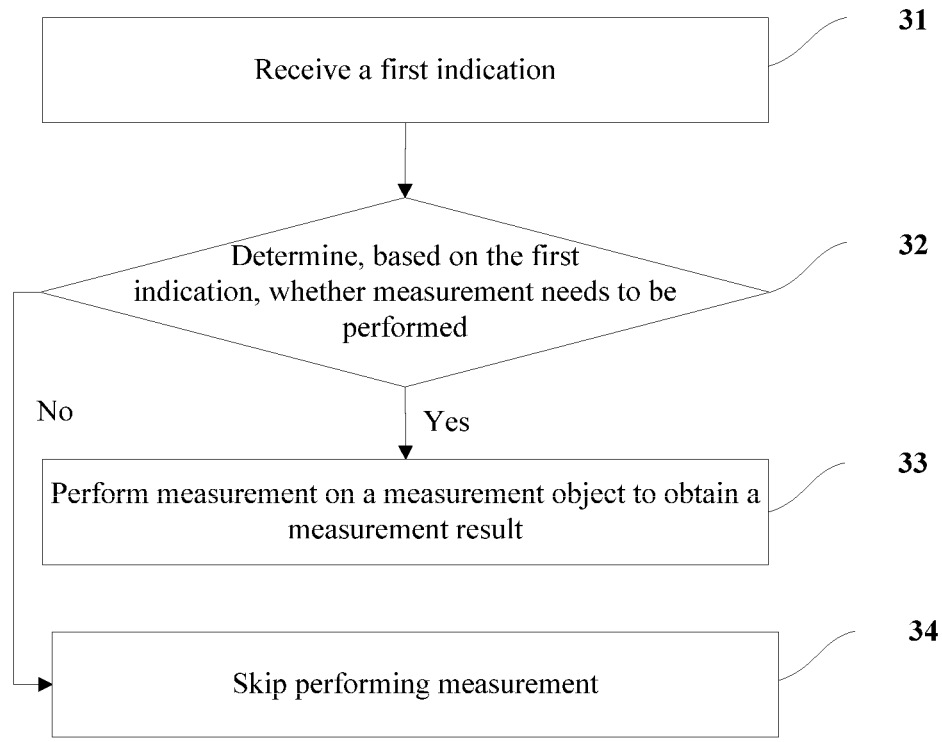
FIG. 3 is a schematic flowchart of a processing method for terminal measurement according to Embodiment 2 of the present disclosure.

Refer to FIG. 3. FIG. 3 is a schematic flowchart of a processing method for terminal measurement according to Embodiment 2 of the present disclosure. The processing method includes the following.

Step 31: Receive a first indication.

In this embodiment of the present disclosure, a terminal receives the first indication sent by a network side device. The network side device may be the network side device in the embodiment shown in FIG. 1.

Step 32: Determine, based on the first indication, whether measurement needs to be performed. If measurement needs to be performed, go to step 33; otherwise, go to step 34.

Step 33: Perform measurement on a measurement object to obtain a measurement result.

Step 34: Skip performing measurement.

In this embodiment of the present disclosure, whether measurement needs to be performed is determined based on the received first indication. When no measurement needs to be performed, measurement is not performed to save power consumption of the terminal.

Figure 4:
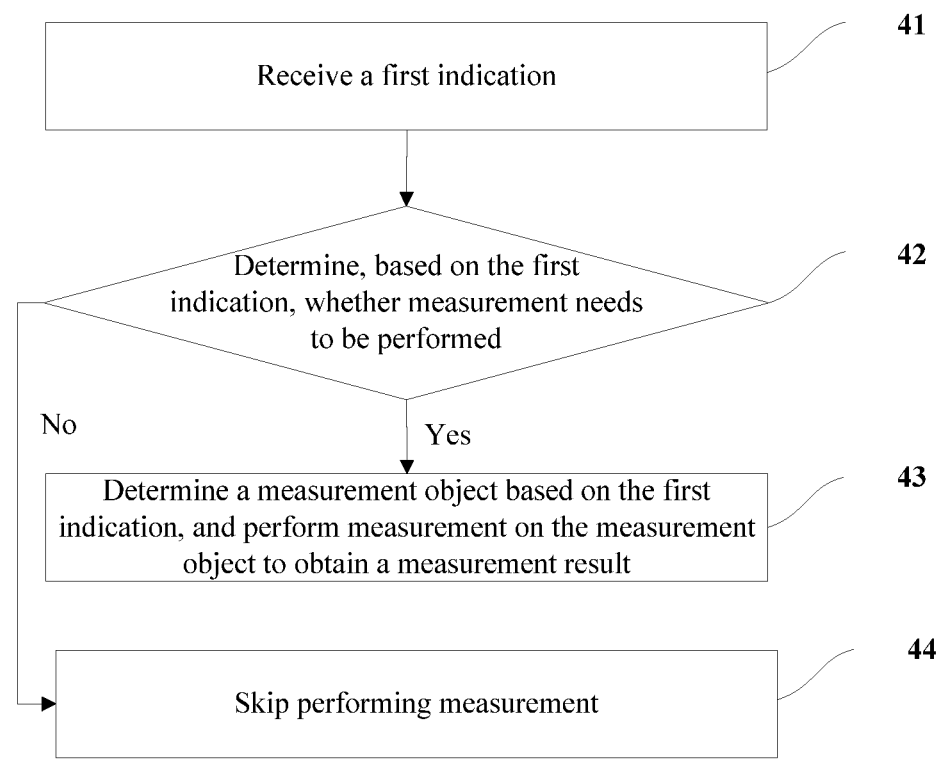
FIG. 4 is a schematic flowchart of a processing method for terminal measurement according to Embodiment 3 of the present disclosure.

Refer to FIG. 4. FIG. 4 is a schematic flowchart of a processing method for terminal measurement according to Embodiment 3 of the present disclosure. The processing method includes the following.

Step 41: Receive a first indication.

In this embodiment of the present disclosure, a terminal receives the first indication sent by a network side device. The network side device may be the network side device in the embodiment shown in FIG. 1.

Step 42: Determine, based on the first indication, whether measurement needs to be performed. If measurement needs to be performed, go to step 43; otherwise, go to step 44.

Step 43: Determine a measurement object based on the first indication, and perform measurement on the measurement object to obtain a measurement result.

Step 44: Skip performing measurement.

In this embodiment of the present disclosure, whether measurement needs to be performed is determined based on the received first indication. When no measurement needs to be performed, measurement is not performed to save power consumption of the terminal. When measurement needs to be performed, the measurement object is determined based on the first indication and measurement is performed only on the determined measurement object instead of all frequencies, to save power consumption of the terminal.

Figure 5:
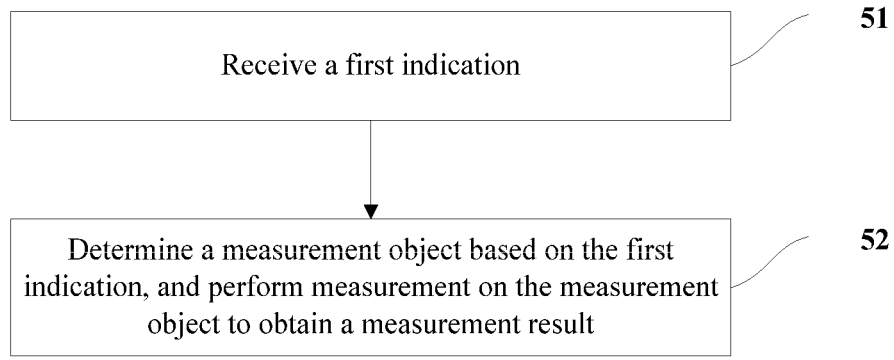
FIG. 5 is a schematic flowchart of a processing method for terminal measurement according to Embodiment 4 of the present disclosure.

Refer to FIG. 5. FIG. 5 is a schematic flowchart of a processing method for terminal measurement according to Embodiment 4 of the present disclosure. The processing method includes the following.

Step 51: Receive a first indication.

In this embodiment of the present disclosure, a terminal receives the first indication sent by a network side device. The network side device may be the network side device in the embodiment shown in FIG. 1.

Step 52: Determine a measurement object based on the first indication, and perform measurement on the measurement object to obtain a measurement result.

In this embodiment of the present disclosure, the measurement object is determined based on the first indication and measurement is performed only on the determined measurement object instead of all frequencies, to save power consumption of the terminal.

In the embodiments shown in FIG. 2, FIG. 3, and FIG. 4 of the present disclosure, the first indication may include a threshold, and the threshold includes at least one of the following:

a first threshold;
a second threshold;
a third threshold; and
a fourth threshold.

That it is determined, based on the first indication, that measurement needs to be performed includes: determining that measurement needs to be performed if at least one of the following conditions is met:

measured performance of a camped cell (cell) is less than the first threshold;
measured performance of a carrier (carrier) of the camped cell is less than the second threshold;
measured performance of a band (band) of the camped cell is less than the third threshold; and
measured performance of a current bandwidth part (Bandwidth Part, BWP) is less than the fourth threshold.

That it is determined, based on the first indication, that no measurement needs to be performed includes: determining that no measurement needs to be performed if at least one of the following conditions is met:

measured performance of a camped cell is greater than the first threshold;
measured performance of a carrier of the camped cell is greater than the second threshold;
measured performance of a band of the camped cell is greater than the third threshold; and
measured performance of a current BWP is greater than the fourth threshold.

In the foregoing content, the measured performance of the camped cell means measured performance of a reference signal of the camped cell;

the measured performance of the carrier of the camped cell means measured performance of a reference signal of the carrier of the camped cell;
the measured performance of the band of the camped cell means measured performance of a reference signal of the band of the camped cell; and
the measured performance of the current BWP means measured performance of a reference signal of the current BWP.

In the foregoing content, the current BWP means a BWP on which the terminal receives paging (paging) or system information (SI). The current BWP can be an initial BWP (initial BWP), a default BWP (default BWP), or a first active BWP (first active BWP).

The foregoing first threshold, second threshold, third threshold, and fourth threshold may all be the same, or some of them may be the same, or all of them may be different.

In the embodiments of the present disclosure, the measured performance may include at least one of the following:

reference signal received power (Reference Signal Received Power, RSRP);
reference signal received quality (Reference Signal Received Quality, RSRQ);
a signal to interference plus noise ratio (Signal to Interference plus Noise Ratio, SINR);
channel state information (Channel State Information, CSI);
a channel quality indicator (Channel quality indicator, CQI);

layer 1 measurement results (L1 measurement results);
layer 2 measurement results (L2 measurement results); and
layer 3 measurement results (L3 measurement results).

The layer 1 measurement results may be layer 1 measurement results of the RSRP, RSRQ, SINR, CSI, and/or CQI.

The layer 2 measurement results may be layer 2 measurement results of the RSRP, RSRQ, SINR, CSI, and/or CQI.

The layer 3 measurement results may be layer 3 measurement results of the RSRP, RSRQ, SINR, CSI, and/or CQI.

In the embodiments of the present disclosure, the measured performances of the camped cell, the carrier of the camped cell, the band of the camped cell, and the current BWP may be the same or may be different.

In the embodiments shown in FIG. 2 and FIG. 3 of the present disclosure, the measurement object may include at least one of the following:
 a preset or configured cell other than the camped cell;
 a preset or configured carrier other than the carrier of the camped cell;
 a preset or configured band other than the band of the camped cell; and
 a preset or configured BWP other than the current BWP.

To be specific, in the embodiments shown in FIG. 2 and FIG. 3, the first indication may include a threshold, and the terminal may determine, based on the first indication, whether measurement needs to be performed. If measurement needs to be performed, measurement is performed on the foregoing measurement object to obtain a measurement result; otherwise, measurement is not performed.

In the embodiments shown in FIG. 4 and FIG. 5 of the present disclosure, the first indication may include indication information used to determine a measurement object, and the indication information includes at least one of the following:
 a band used as the measurement object;
 a carrier used as the measurement object;
 a cell used as the measurement object;
 a reference signal used as the measurement object;
 a BWP used as the measurement object; and
 a priority of a frequency.

The reference signal may be at least one of the following: a reference signal on a band, a reference signal on a carrier, a reference signal on a cell, and a reference signal on a BWP.

Optionally, the indication information includes at least one of the following:
 a target band;
 a target carrier in a target band, where a measurement result of a cell within the target carrier can represent a measurement result of the target band, that is, only the target carrier is measured for the target band;
 a target cell within a target carrier, where a measurement result of the target cell can represent a measurement result of the target carrier, that is, only the target cell is measured for the target carrier;
 a target reference signal of a target cell, where a measurement result of the target reference signal can represent a measurement result of the target cell, that is, only the target reference signal is measured for the target cell;
 a target BWP; and
 a priority of a frequency.

If the target band is indicated in the indication information, the target band may be used as the measurement object. If the target carrier in the target band is indicated in the indication information, the target carrier may be used as the measurement object, and a measurement result of the target carrier can represent the measurement result of the target band.

If the target cell within the target carrier is indicated in the indication information, the target cell may be used as the measurement object, and the measurement result of the target cell can represent the measurement result of the target carrier.

If the target reference signal of the target cell is indicated in the indication information, the target reference signal may be used as the measurement object, and the measurement result of the target reference signal can represent the measurement result of the target cell.

If the target BWP is indicated in the indication information, the target BWP may be used as the measurement object.

If the priority of the frequency is indicated in the indication information, the terminal may determine the measurement object based on the priority of the frequency, for example, a frequency with a high priority is used as the measurement object.

To be specific, in the embodiments shown in FIG. 1 and FIG. 4, the first indication may include a threshold and indication information used to determine the measurement object. The terminal may first determine, based on the threshold in the first indication, whether measurement needs to be performed; and if it is determined that measurement needs to be performed, determine the measurement object based on the first indication, and perform measurement on the measurement object to obtain a measurement result.

In the embodiment shown in FIG. 5, the first indication includes indication information used to determine the measurement object, and the terminal directly determines the measurement object based on the first indication information, and performs measurement on the measurement object to obtain a measurement result.

Due to co-location (Co-location) or quasi co-location (Quasi Co-Location, QCL) deployment of different frequencies, measurement results of different frequencies may be similar. Therefore, in the embodiments of the present disclosure, the indication information may be used to indicate a band, a carrier, a cell, a reference signal and/or a BWP used as the measurement object, and only the measurement object indicated by the indication information, instead of all frequencies, is measured, thereby saving power consumption of the terminal.

In the embodiments of the present disclosure, the BWP used as the measurement object includes at least one of the following:
 a first active BWP;
 an initial BWP; and
 a default BWP.

Measurement on the measurement object is mentioned in the foregoing embodiments, and the following describes which measurements are included in the measurement.

In the foregoing embodiments of the present disclosure, the performing measurement on a measurement object to obtain a measurement result may include: performing at least one of the following measurement operations on the measurement object:
 layer 1 measurement;
 layer 2 measurement;
 layer 3 measurement; and
 layer 3 filtering.

The layer 1 measurement and the layer 2 measurement each can obtain a measurement value. However, the layer 3 measurement and the layer 3 filtering belong to a same meaning, and an obtained measurement result is an average value of measured values of layer 1 or layer 2 in a window.

In the foregoing embodiments of the present disclosure, after the measurement result is obtained by performing measurement the measurement object, the following may be further included: performing cell selection or reselection based on the measurement result. In other words, the obtained measurement result is used for cell selection or reselection. Certainly, in some other embodiments of the present disclosure, the obtained measurement result may also be used in another scenario. The following briefly describes cell selection and reselection in a new radio interface (NR) system.

1. Initial Cell Selection Process (a Terminal does not Know in Advance which Radio Frequency Channel (RF Channel) is an NR Carrier)

The terminal scans (scan) all radio frequency channels one by one based on its own capabilities to search for a suitable (suitable) NR cell. At each scanned carrier frequency, the terminal needs to search only for a cell with strongest signal quality, and once a suitable cell is found, selects the cell to camp on; and stops the initial cell selection process, that is, skips scanning unscanned radio frequency channels.

The mentioned suitable cell meets at least all of the following conditions:
  (1) signal quality of the cell meets a preset condition, where the signal quality includes: RSRP and/or RSRQ;
  (2) the terminal can obtain necessary system information, at least including a master information block (Master Information Block, MIB) and system information block 1 (System Information Block 1, SIB1); and
  (3) a cellbar IE in the system information (a value of the cellbar IE can be barred (barred) or notBarred (not barred)) is set to notBarred, that is, the cell is not barred from attaching or accessing.

2. Cell Reselection Process

Based on a frequency priority order provided by a network, a terminal sequentially evaluates, starting from a highest-priority frequency, whether each frequency has a suitable target cell for reselection, where only a suitable cell can be used as the target cell for reselection.

Same or different frequency priorities can be configured for different frequencies.

Specifically:

When the terminal camps on a serving cell, if a cell with a higher-priority NR or long term evolution (LTE) frequency meets the following in a period of time (TreselectionRAT): Cell signal quality (Squal)>Threshold $Thresh_{x,\ HighP}$; or
  if a cell with a higher priority NR or another-radio access technology (Radio Access Technology, RAT) frequency meets the following in a period of time (TreselectionRAT): Signal strength (Srxlev)>Threshold $Thresh_{x,\ HighP}$ and the terminal has camped on the current serving cell for more than one second;
  the terminal initiates a reselection process to a cell with a higher-priority NR or another-RAT frequency.

3. Suitable Cell (Suitable Cell)

A suitable cell means a cell on which the terminal can camp and from which the terminal can obtain a normal service. The terminal needs to have a valid universal subscriber identity module (Universal Subscriber Identity Module, USIM), and the foregoing suitable cell meets at least the following characteristics:
  (1) the cell belongs to a public land mobile network (Public Land Mobile Network, PLMN) registered by the terminal;
  (2) the cell belongs to a selected PLMN (Selected PLMN) or registered PLMN (Registered PLMN) or a PLMN in an equivalent PLMN list (Equivalent PLMN list);
  (3) the cell meets cell selection criteria, namely, R-criteria (cell selection criteria) and S-criteria (cell reselection criteria);
  (4) the cell is not barred (bar) from being camped on; and
  (5) tracking area (Tracking Area, TA) information broadcast by the cell does not belong to a list of "forbidden tracking areas" (list of "Forbidden Tracking Areas).

As mentioned in the foregoing content, the obtained measurement result can be used for cell selection or reselection. The following describes how to perform cell selection or reselection based on the measurement result. It should be noted that, in the embodiments of the present disclosure, during cell selection or reselection, the cell selection or reselection is not only based on the measurement result, but also needs to comply with cell selection criteria, namely, the R-criteria or the S-criteria.

In the embodiments of the present disclosure, the performing cell selection or reselection based on the measurement result may include one of the following:
  (1) selecting a band, selecting a carrier from the selected band, and performing cell selection or reselection based on a measurement result of a target cell within the selected carrier;
  (2) performing cell selection or reselection based on a measurement result of a cell that is within each carrier and that is indicated in the first indication; or
  (3) selecting a carrier based on a terminal identifier, and performing cell selection or reselection based on a measurement result of a target cell within the selected carrier.

For the foregoing method (1), in the embodiments of the present disclosure, the selecting a band may include either of the following:
  (11A) Selecting a band with a best measurement result based on a measurement result of each band.

The mentioned band with the best measurement result means a band with highest measured performance.

To be specific, a carrier is selected from the band with the best measurement result, and cell selection or reselection is performed based on a measurement result of a target cell within the selected carrier, so that the terminal can select or reselect a cell with a better measurement result.

(12A) Selecting a band based on the terminal identifier.

To be specific, a band is selected based on the terminal identifier, a carrier is selected from the selected band, and cell selection or reselection is performed based on a measurement result of a target cell within the selected carrier, so that the terminal can select or reselect a cell with a better measurement result.

Selecting a band based on the terminal identifier can prevent all terminals from selecting the band with the best measurement result based on the measurement result, thereby avoiding unbalanced load of this band, achieving load balance of each band, and reducing conflicts of random access channel (Random Access Channel, RACH) initiation.

For the foregoing method (1), in the embodiments of the present disclosure, the selecting a carrier from the selected band may include either of the following:
  (11B) randomly selecting a carrier from the selected band; and
  (12B) selecting a carrier from the selected band based on the terminal identifier.

Either selecting a carrier based on the terminal identifier or randomly selecting a carrier can avoid carrier load imbalance, achieve load balancing of each carrier, and reduce conflicts of random access channel initiation.

For the foregoing methods (1) and (3), in the embodiments of the present disclosure, the target cell may include either of the following: each cell within the selected carrier; and a cell that is within the selected carrier and that is indicated in the first indication.

In the foregoing embodiments of the present disclosure, the terminal identifier may be some or all of bits in the following identifier:

international mobile equipment identity (International Mobile Equipment Identity, IMEI);

international mobile subscriber identity (International Mobile Subscriber Identity, IMSI); or 5G S-temporary mobile subscription identifier (5G S-Temporary Mobile Subscription Identifier, 5G-S-TMSI).

In the foregoing (12A), the selecting a band based on the terminal identifier may include: calculating UE_ID mod N to obtain an index of the selected band, where UE_ID is the terminal identifier, mod is a remainder function, and N is a quantity of bands.

In the foregoing embodiments, the selecting a carrier based on the terminal identifier may include: calculating UE_ID mod M to obtain an index of the selected carrier, where UE_ID is the terminal identifier, mod is a remainder function, and M is a quantity of carriers. The mentioned quantity of carriers may be a quantity of carriers in one band, or a total quantity of carriers in all bands.

In some embodiments of the present disclosure, the first indication may further include a measurement compensation value corresponding to a frequency. In this case, the performing cell selection or reselection based on the measurement result includes: performing cell selection or reselection based on the measurement compensation value and the measurement result.

For example, a measurement result of a cell 1 is 3 decibels (dB), a measurement result of a cell 2 is 4 dB, a measurement compensation value corresponding to a frequency of the cell 1 is 2 decibels, and a measurement compensation value corresponding to a frequency of the cell 2 is 0 decibels. In this case, for comparison between the measurement results of cell 1 and cell 2, the measurement result of the cell and the measurement compensation value need to be added up, to obtain a compensated measurement result. To be specific, after the compensation, the measurement result of the cell 1 is 5 dB, and the measurement result of the cell 2 of is 4 dB. Therefore, the cell 1 can be chosen as a selected or reselected cell.

Figure 6:
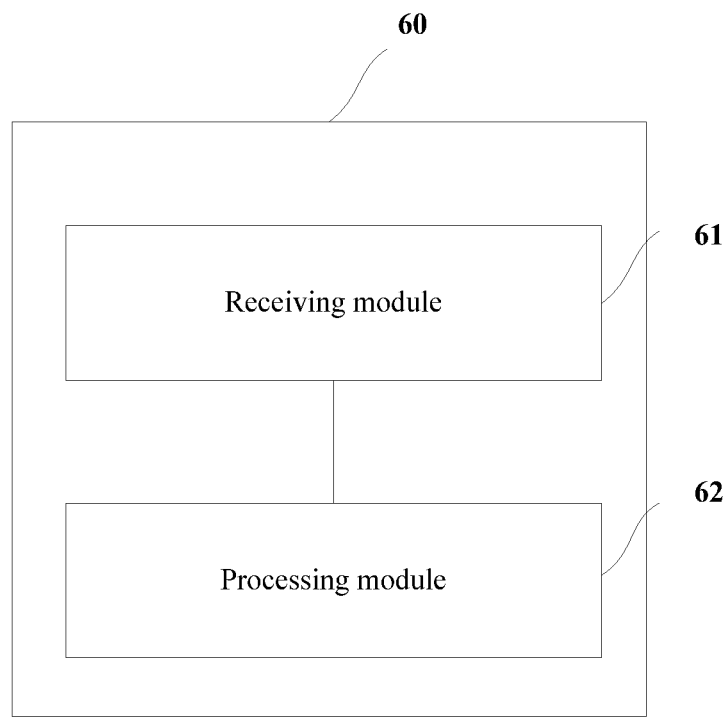
FIG. 6 is a schematic structural diagram of a terminal according to an embodiment of the present disclosure.

Refer to FIG. 6. Based on a same invention conception, an embodiment of the present disclosure further provides a terminal 60, including:

a receiving module 61, configured to receive a first indication; and a processing module 62, configured to perform a first operation based on the first indication, where the first operation includes one of the following:

if it is determined, based on the first indication, that measurement needs to be performed, performing measurement on a measurement object to obtain a measurement result;

if it is determined, based on the first indication, that no measurement needs to be performed, skipping performing measurement;

determining a measurement object based on the first indication, and performing measurement on the measurement object to obtain a measurement result; or if it is determined, based on the first indication, that measurement needs to be performed, determining a measurement object based on the first indication, and performing measurement on the measurement object to obtain a measurement result.

Optionally, the terminal 50 further includes:

a selection or reselection module, configured to perform cell selection or reselection based on the measurement result.

Optionally, the first indication includes a threshold, and the threshold includes at least one of the following:

a first threshold;

a second threshold;

a third threshold; and a fourth threshold.

That it is determined, based on the first indication, that measurement needs to be performed includes: determining that measurement needs to be performed if at least one of the following conditions is met:

measured performance of a camped cell is less than the first threshold;

measured performance of a carrier of the camped cell is less than the second threshold;

measured performance of a band of the camped cell is less than the third threshold; and measured performance of a current BWP is less than the fourth threshold.

Optionally, the first indication includes a threshold, and the threshold includes at least one of the following:

a first threshold;

a second threshold;

a third threshold; and a fourth threshold.

That it is determined, based on the first indication, that no measurement needs to be performed includes: determining that no measurement needs to be performed if at least one of the following conditions is met:

measured performance of a camped cell is greater than the first threshold;

measured performance of a carrier of the camped cell is greater than the second threshold;

measured performance of a band of the camped cell is greater the third threshold; and measured performance of a current BWP is greater than the fourth threshold.

Optionally, the measured performance includes at least one of the following:

reference signal received power;

reference signal received quality;

signal to interference plus noise ratio;

channel state information;

channel quality indicator;

layer 1 measurement results;

layer 2 measurement results; and layer 3 measurement results.

Optionally, the measurement object includes at least one of the following:

a preset or configured cell other than the camped cell;

a preset or configured carrier other than the carrier of the camped cell;

a preset or configured band other than the band of the camped cell; and a preset or configured BWP other than the current BWP.

Optionally, the first indication includes indication information used to determine a measurement object, and the indication information includes at least one of the following:
- a band used as the measurement object;
- a carrier used as the measurement object;
- a cell used as the measurement object;
- a reference signal used as the measurement object;
- a BWP used as the measurement object;
- a priority of a frequency; and
- a target band.

Optionally, the indication information includes at least one of the following:
- a target carrier in a target band, where a measurement result of a cell within the target carrier can represent a measurement result of the target band;
- a target cell within a target carrier, where a measurement result of the target cell can represent a measurement result of the target carrier;
- a target reference signal of a target cell, where a measurement result of the target reference signal can represent a measurement result of the target cell;
- a target BWP; and
- a priority of a frequency.

Optionally, the BWP used as the measurement object includes at least one of the following:
- a first active BWP;
- an initial BWP; and
- a default BWP.

Optionally, the processing module 62 is configured to perform at least one of the following measurement operations on the measurement object:
- layer 1 measurement;
- layer 2 measurement;
- layer 3 measurement; and
- layer 3 filtering.

Optionally, the selection or reselection module is configured to perform one of the following:
- selecting a band, selecting a carrier from the selected band, and performing cell selection or reselection based on a measurement result of a target cell within the selected carrier;
- performing cell selection or reselection based on a measurement result of a cell that is within each carrier and that is indicated in the first indication; or
- selecting a carrier based on a terminal identifier, and performing cell selection or reselection based on a measurement result of a target cell within the selected carrier.

Optionally, the selection or reselection module is configured to perform either of the following:
- selecting a band based on the terminal identifier; and
- selecting a band with a best measurement result based on a measurement result of each band.

Optionally, the selection or reselection module is configured to perform either of the following:
- randomly selecting a carrier from the selected band; and
- selecting a carrier from the selected band based on the terminal identifier.

Optionally, the target cell includes at least either of the following:
- each cell within the selected carrier; and
- a cell that is within the selected carrier and that is indicated in the first indication.

Optionally, the terminal identifier is some or all of bits in the following identifier:
- international mobile equipment identity;
- international mobile subscriber identity; or
- 5G S-temporary mobile subscription identifier.

Optionally, the selection or reselection module is configured to calculate UE_ID mod N to obtain an index of the selected band, where UE_ID is the terminal identifier, mod is a remainder function, and N is a quantity of bands.

Optionally, the selection or reselection module is configured to calculate UE_ID mod M to obtain an index of the selected carrier, where UE_ID is the terminal identifier, mod is a remainder function, and M is a quantity of carriers.

Optionally, the first indication further includes a measurement compensation value corresponding to a frequency, and the selection or reselection module is configured to perform cell selection or reselection based on the measurement compensation value and the measurement result.

The terminal provided in the embodiment of the present disclosure can implement processes implemented by the terminal in the method embodiments shown in FIG. 2 to FIG. 5. To avoid repeated description, details are not described herein again.

Figure 7:
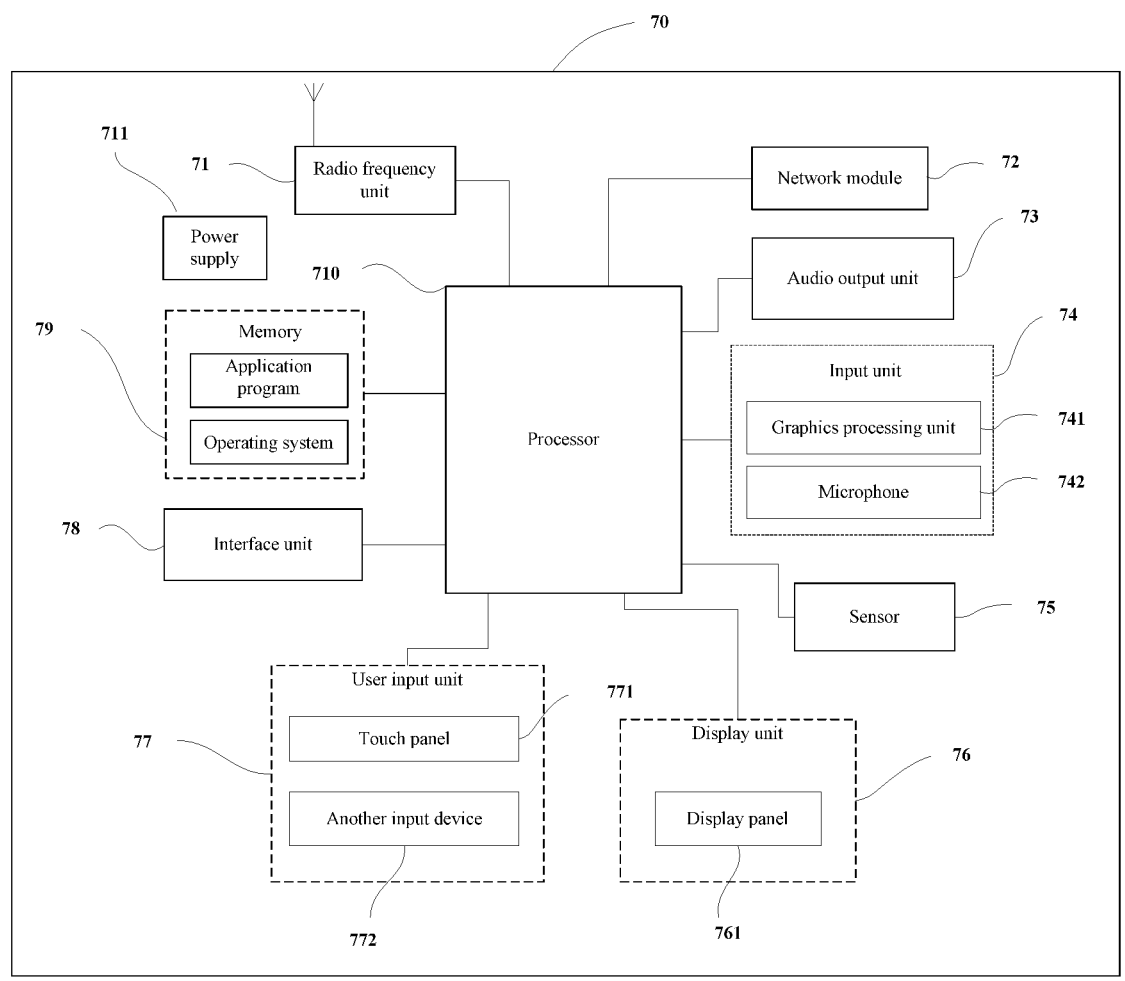
FIG. 7 is a schematic structural diagram of a terminal according to another embodiment of the present disclosure.

Refer to FIG. 7. FIG. 7 is a schematic structural diagram of a terminal according to another embodiment of the present disclosure. The terminal 70 includes but is not limited to: components such as a radio frequency unit 71, a network module 72, an audio output unit 73, an input unit 74, a sensor 75, a display unit 76, a user input unit 77, an interface unit 78, a memory 79, a processor 710, and a power supply 711. A person skilled in the art may understand that a structure of the terminal shown in FIG. 7 does not constitute a limitation on the terminal, and the terminal may include more or fewer components than those shown in the figure, or combine some components, or have different component arrangements. In this embodiment of the present disclosure, the terminal includes but is not limited to, a mobile phone, a tablet computer, a notebook computer, a palmtop computer, an in-vehicle terminal, a wearable device, a pedometer, or the like.

The radio frequency unit 71 is configured to receive a first indication.

The processor 710 is configured to perform a first operation based on the first indication, where the first operation includes one of the following:
- if it is determined, based on the first indication, that measurement needs to be performed, performing measurement on a measurement object to obtain a measurement result;
- if it is determined, based on the first indication, that no measurement needs to be performed, skipping performing measurement;
- determining a measurement object based on the first indication, and performing measurement on the measurement object to obtain a measurement result; or
- if it is determined, based on the first indication, that measurement needs to be performed, determining a measurement object based on the first indication, and performing measurement on the measurement object to obtain a measurement result.

In this embodiment of the present disclosure, whether measurement needs to be performed is determined based on the received first indication. When no measurement needs to be performed, measurement is not performed to save power consumption of the terminal, or the measurement object is determined based on the first indication and measurement is performed only on the determined measurement object instead of all frequencies, to save power consumption of the terminal.

It should be understood that in this embodiment of the present disclosure, the radio frequency unit 71 may be configured to receive and transmit information, or receive and transmit a signal during a call. Specifically, the radio frequency unit 71 receives downlink data from a base station, and then transmits the downlink data to the processor 710 for processing; and in addition, transmits uplink data to the base station. Usually, the radio frequency unit 71 includes but is not limited to: an antenna, at least one amplifier, a transceiver, a coupler, a low-noise amplifier, a duplexer, and the like. In addition, the radio frequency unit 71 may communicate with a network and another device through a wireless communications system.

The terminal provides wireless broadband Internet access to a user through the network module 72, for example, helps the user receive and send e-mails, browse web pages, and access streaming media, etc.

The audio output unit 73 may convert audio data received by the radio frequency unit 71 or the network module 72 or stored in the memory 79 into an audio signal, and output the audio signal as a sound. In addition, the audio output unit 73 may further provide audio output (for example, call signal receiving sound or message receiving sound) related to a specific function performed by the terminal 70. The audio output unit 73 includes a speaker, a buzzer, a receiver, and the like.

The input unit 74 is configured to receive audio or video signals. The input unit 74 may include a graphics processing unit (Graphics Processing Unit, GPU) 741 and a microphone 742. The graphics processing unit 741 processes image data of a static picture or video obtained by an image capture apparatus (such as a camera) in a video capture mode or an image capture mode. A processed image frame may be displayed on the display unit 76. An image frame processed by the graphics processing unit 741 may be stored in the memory 79 (or another storage medium) or sent via the radio frequency unit 71 or the network module 72. The microphone 742 can receive sound, and can process such sound into audio frequency data. The processed audio data may be converted, in a telephone call mode, into a format that may be sent by the radio frequency unit 71 to a mobile communication base station for output.

The terminal 70 further includes at least one type of sensor 75, such as a light sensor, a motion sensor, and another sensor. Specifically, the light sensor includes an ambient light sensor and a proximity sensor. The ambient light sensor may adjust luminance of the display panel 761 based on brightness of ambient light, and the proximity sensor may turn off the display panel 761 and/or backlight when the terminal 70 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 75 may further include a fingerprint sensor, a pressure sensor, an iris sensor, a molecular sensor, a gyroscope, a barometer, a hygrometer, a thermometer, an infrared sensor, and the like. Details are not described herein.

The display unit 76 is configured to display information entered by the user or information provided for the user. The display unit 76 may include the display panel 761, and the display panel 761 may be configured in a form of a liquid crystal display (Liquid Crystal Display, LCD), an organic light-emitting diode (Organic Light-Emitting Diode, OLED), or the like.

The user input unit 77 may be configured to receive input numeral or character information, and generate key signal input related to user setting and functional control of the terminal. Specifically, the user input unit 77 includes a touch panel 771 and another input device 772. The touch panel 771, also referred to as a touchscreen, can collect a touch operation (such as an operation on or near the touch panel 771 performed by a user by using any suitable object or accessory such as a finger or a stylus) performed by a user on or near the touch panel 771. The touch panel 771 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 710, and receives and executes a command sent by the processor 710. In addition, the touch panel 771 may be implemented as a resistive type, a capacitive type, an infrared type, a surface acoustic wave type, or the like. In addition to the touch panel 771, the user input unit 77 may further include another input device 772. Specifically, the another input device 772 may include, but is not limited to, a physical keyboard, functional keys (for example, a volume control key and a switch key), a trackball, a mouse, and a joystick. Details are not described herein again.

Further, the touch panel 771 can cover the display panel 761. When detecting a touch operation on or near the touch panel 771, the touch panel 8071 transmits the touch operation to the processor 710 to determine a type of a touch event. Then, the processor 710 provides corresponding visual output on the display panel 761 based on the type of the touch event. Although the touch panel 771 and the display panel 761 are used as two separate components to implement input and output functions of the terminal in FIG. 7, in some embodiments, the touch panel 771 and the display panel 761 may be integrated to implement the input and output functions of the terminal. This is not specifically limited herein.

The interface unit 78 is an interface connecting an external apparatus and the terminal 70. For example, the interface unit 78 may include a wired or wireless headset jack, an external power supply (or a battery charger) port, a wired or wireless data port, a storage card port, a port for connecting an apparatus having a recognition module, an audio input/output (I/O) port, a video I/O port, an earphone jack, or the like. The interface unit 78 may be configured to receive an input (such as data information or electric power) from the external apparatus and transmit the received input to one or more elements of the terminal 70, or may be configured to transmit data between the terminal 70 and the external apparatus.

The memory 79 may be configured to store a software program as well as various types of data. The memory 79 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 79 may include a high-speed random access memory, and may further include a non-volatile memory such as at least one magnetic disk storage device, a flash memory device, or another volatile solid-state storage device.

The processor 710 is a control center of the terminal, and is connected to all parts of the entire terminal by using various interfaces and lines, and performs various functions of the terminal and processes data by running or executing the software program and/or a module that are stored in the memory 79 and invoking the data stored in the memory 79, to implement overall monitoring on the terminal. The processor 710 can include one or more processing units. Preferably, the processor 710 can be integrated with an application processor and a modem processor. The application processor mainly processes the operating system, the user interface, applications, and the like. The modem processor mainly processes wireless communication. It can be understood that alternatively, the modem processor may not be integrated into the processor 710.

The terminal 70 may further include the power supply 711 (such as a battery) that supplies power to each component. Preferably, the power supply 711 may be logically connected to the processor 710 by using a power management system, so as to implement functions such as charging, discharging, and power consumption management by using the power management system.

In addition, the terminal 70 includes some function modules not shown. Details are not described herein.

Figure 8:
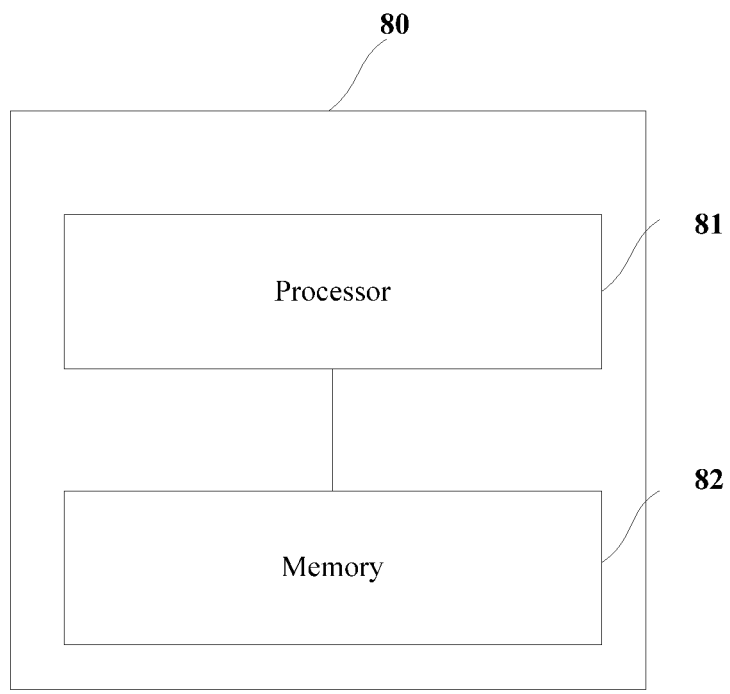
FIG. 8 is a schematic structural diagram of a terminal according to still another embodiment of the present disclosure.

Refer to FIG. 8. FIG. 8 is a schematic structural diagram of a terminal according to still another embodiment of the present disclosure. The terminal 80 includes: a processor 81 and a memory 82. In this embodiment of the present disclosure, the terminal 80 further includes a computer program stored in the memory 82 and executable on the processor 81. The computer program, when executed by the processor 81, implements the following steps:
receiving a first indication; and
performing a first operation based on the first indication, where the first operation includes one of the following:
if it is determined, based on the first indication, that measurement needs to be performed, performing measurement on a measurement object to obtain a measurement result;
if it is determined, based on the first indication, that no measurement needs to be performed, skipping performing measurement;
determining a measurement object based on the first indication, and performing measurement on the measurement object to obtain a measurement result; or
if it is determined, based on the first indication, that measurement needs to be performed, determining a measurement object based on the first indication, and performing measurement on the measurement object to obtain a measurement result.

The processor 81 is responsible for managing a bus architecture and common processing, and the memory 82 may store data used when the processor 81 performs an operation.

Optionally, the computer program, when executed by the processor 81, may further implement the following step:

After the performing measurement on a measurement object to obtain a measurement result, the following is further included:
performing cell selection or reselection based on the measurement result.

Optionally, the first indication includes a threshold, and the threshold includes at least one of the following:
a first threshold;
a second threshold;
a third threshold; and
a fourth threshold.

The computer program, when executed by the processor 81, may further implement the following step:
That it is determined, based on the first indication, that measurement needs to be performed includes:
determining that measurement needs to be performed if at least one of the following conditions is met:
measured performance of a camped cell is less than the first threshold;
measured performance of a carrier of the camped cell is less than the second threshold;
measured performance of a band of the camped cell is less than the third threshold; and
measured performance of a current BWP is less than the fourth threshold.

Optionally, the first indication includes a threshold, and the threshold includes at least one of the following:
a first threshold;
a second threshold;
a third threshold; and
a fourth threshold.

The computer program, when executed by the processor 81, may further implement the following step:
That it is determined, based on the first indication, that no measurement needs to be performed includes: determining that no measurement needs to be performed if at least one of the following conditions is met:
measured performance of a camped cell is greater than the first threshold;
measured performance of a carrier of the camped cell is greater than the second threshold;
measured performance of a band of the camped cell is greater than the third threshold; and
measured performance of a current BWP is greater than the fourth threshold.

Optionally, the measured performance includes at least one of the following:
reference signal received power;
reference signal received quality;
signal to interference plus noise ratio;
channel state information;
channel quality indicator;
layer 1 measurement results;
layer 2 measurement results; and
layer 3 measurement results.

Optionally, the measurement object includes at least one of the following:
a preset or configured cell other than the camped cell;
a preset or configured carrier other than the carrier of the camped cell;
a preset or configured band other than the band of the camped cell; and
a preset or configured BWP other than the current BWP.

Optionally, the first indication includes indication information used to determine a measurement object, and the indication information includes at least one of the following:
a band used as the measurement object;
a carrier used as the measurement object;
a cell used as the measurement object;
a reference signal used as the measurement object;
a BWP used as the measurement object; and
a priority of a frequency.

Optionally, the indication information includes at least one of the following:
a target band;
a target carrier in a target band, where a measurement result of a cell within the target carrier can represent a measurement result of the target band;
a target cell within a target carrier, where a measurement result of the target cell can represent a measurement result of the target carrier;
a target reference signal of a target cell, where a measurement result of the target reference signal can represent a measurement result of the target cell;
a target BWP; and
a priority of a frequency.

Optionally, the BWP used as the measurement object includes at least one of the following:
a first active BWP;
an initial BWP; and
a default BWP.

Optionally, the computer program, when executed by the processor 81, may further implement the following step:
The performing measurement on a measurement object to obtain a measurement result includes:
performing at least one of the following measurement operations on the measurement object:
layer 1 measurement;
layer 2 measurement;
layer 3 measurement; and
layer 3 filtering.

Optionally, the computer program, when executed by the processor 81, may further implement the following step:
The performing cell selection or reselection based on the measurement result includes one of the following:
selecting a band, selecting a carrier from the selected band, and performing cell selection or reselection based on a measurement result of a target cell within the selected carrier;
performing cell selection or reselection based on a measurement result of a cell that is within each carrier and that is indicated in the first indication; or
selecting a carrier based on a terminal identifier, and performing cell selection or reselection based on a measurement result of a target cell within the selected carrier.

Optionally, the computer program, when executed by the processor 81, may further implement the following:
The selecting a band includes either of the following:
selecting a band based on the terminal identifier; and
selecting a band with a best measurement result based on a measurement result of each band.

Optionally, the computer program, when executed by the processor 81, may further implement the following step:
The selecting a carrier from the selected band includes either of the following:
randomly selecting a carrier from the selected band; and
selecting a carrier from the selected band based on the terminal identifier.

Optionally, the target cell includes either of the following:
each cell within the selected carrier; and
a cell that is within the selected carrier and that is indicated in the first indication.

Optionally, the terminal identifier is some or all of bits in the following identifier:
international mobile equipment identity;
international mobile subscriber identity; or
5G S-temporary mobile subscription identifier.

Optionally, the computer program, when executed by the processor 81, may further implement the following step:
The selecting a band based on the terminal identifier includes:
calculating UE_ID mod N to obtain an index of the selected band, where UE_ID is the terminal identifier, mod is a remainder function, and N is a quantity of bands.

Optionally, the computer program, when executed by the processor 81, may further implement the following step:
The selecting a carrier based on the terminal identifier includes:
calculating UE_ID mod M to obtain an index of the selected carrier, where UE_ID is the terminal identifier, mod is a remainder function, and M is a quantity of carriers.

Optionally, the first indication further includes a measurement compensation value corresponding to a frequency, and the computer program, when executed by the processor 81, may further implement the following step: The performing cell selection or reselection based on the measurement result includes: performing cell selection or reselection based on the measurement compensation value and the measurement result.

An embodiment of the present disclosure further provides a computer-readable storage medium. The computer-readable storage medium stores a computer program. The computer program, when executed by a processor, implement processes of the embodiment of the foregoing processing method for terminal measurement, and a same technical effect can be achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A processing method for terminal measurement, comprising:
 receiving a first indication; and
 performing a first operation based on the first indication, wherein the first operation comprises one of the following:
 if it is determined, based on the first indication, that measurement needs to be performed, performing measurement on a measurement object to obtain a measurement result;
 if it is determined, based on the first indication, that no measurement needs to be performed, skipping performing measurement;
 determining a measurement object based on the first indication, and performing measurement on the measurement object to obtain a measurement result; or
 if it is determined, based on the first indication, that measurement needs to be performed, determining a measurement object based on the first indication, and performing measurement on the measurement object to obtain a measurement result;
 wherein the first indication comprises a threshold, and the threshold comprises at least one of the following:
 a first threshold;
 a second threshold;
 a third threshold; or
 a fourth threshold; and
 that it is determined, based on the first indication, that measurement needs to be performed comprises: determining that measurement needs to be performed if at least one of the following conditions is met:
 measured performance of a camped cell is less than the first threshold;
 or
 measured performance of a band of the camped cell is less than the third threshold.

2. The method according to claim 1, after the performing measurement on a measurement object to obtain a measurement result, further comprising:
 performing cell selection or reselection based on the measurement result.

3. The method according to claim 2, wherein the performing cell selection or reselection based on the measurement result comprises one of the following:
 selecting a band, selecting a carrier from the selected band, and performing cell selection or reselection based on a measurement result of a target cell within the selected carrier;
 performing cell selection or reselection based on a measurement result of a cell that is within each carrier and that is indicated in the first indication; or
 selecting a carrier based on a terminal identifier, and performing cell selection or reselection based on a measurement result of a target cell within the selected carrier.

4. The method according to claim 3, wherein the selecting a band comprises either of the following:
 selecting a band based on the terminal identifier; and
 selecting a band with a best measurement result based on a measurement result of each band.

5. The method according to claim 4, wherein the selecting a band based on the terminal identifier comprises:
 calculating UE_ID mod N to obtain an index of the selected band, wherein UE_ID is the terminal identifier, mod is a remainder function, and N is a quantity of bands.

6. The method according to claim 4, wherein the selecting a carrier based on the terminal identifier comprises:
 calculating UE_ID mod M to obtain an index of the selected carrier, wherein UE_ID is the terminal identifier, mod is a remainder function, and M is a quantity of carriers.

7. The method according to claim 3, wherein the selecting a carrier from the selected band comprises either of the following:
 randomly selecting a carrier from the selected band; and
 selecting a carrier from the selected band based on the terminal identifier.

8. The method according to claim 3, wherein the target cell comprises either of the following:
 each cell within the selected carrier; and
 a cell that is within the selected carrier and that is indicated in the first indication.

9. The method according to claim 3, wherein the terminal identifier is some or all of bits in the following identifier:
 international mobile equipment identity;
 international mobile subscriber identity; or
 5G S-temporary mobile subscription identifier.

10. The method according to claim 2, wherein the first indication further comprises a measurement compensation value corresponding to a frequency; and
 the performing cell selection or reselection based on the measurement result comprises:
 performing cell selection or reselection based on the measurement compensation value and the measurement result.

11. The method according to claim 1, wherein the measured performance further comprises at least one of the following:
 reference signal received power; or
 reference signal received quality.

12. The method according to claim 1, wherein the measurement object comprises at least one of the following:
 a preset or configured cell other than the camped cell;
 a preset or configured carrier other than the carrier of the camped cell;
 a preset or configured band other than the band of the camped cell; or
 a preset or configured BWP other than the current BWP.

13. The method according to claim 1, wherein the first indication further comprises indication information used to determine a measurement object, and the indication information comprises at least one of the following:
 a band used as the measurement object;
 a carrier used as the measurement object;
 a cell used as the measurement object;
 a reference signal used as the measurement object;
 a BWP used as the measurement object; or
 a priority of a frequency.

14. The method according to claim 13, wherein the indication information comprises at least one of the following:
 a target band;
 a target carrier in a target band, wherein a measurement result of a cell within the target carrier can represent a measurement result of the target band;

a target cell within a target carrier, wherein a measurement result of the target cell can represent a measurement result of the target carrier;

a target reference signal of a target cell, wherein a measurement result of the target reference signal can represent a measurement result of the target cell;

a target BWP; or a priority of a frequency.

15. The method according to claim 13, wherein the BWP used as the measurement object comprises at least one of the following:

a first active BWP;

an initial BWP; or a default BWP.

16. The method according to claim 1, wherein the performing measurement on a measurement object to obtain a measurement result comprises: performing at least one of the following measurement operations on the measurement object:

layer 1 measurement;

layer 2 measurement;

layer 3 measurement; or layer 3 filtering.

17. The method according to claim 1, wherein that it is determined, based on the first indication, that measurement needs to be performed comprises: determining that measurement needs to be performed if the following condition is met:

measured performance of a carrier of the camped cell is less than the second threshold;

measured performance of a current BWP is less than the fourth threshold;

wherein the measured performance comprises at least one of the following:

signal to interference plus noise ratio;

channel state information;

channel quality indicator;

layer 1 measurement results;

layer 2 measurement results; or layer 3 measurement results.

18. A terminal, comprising: comprising: a processor, a memory, and a computer program stored in the memory and executable on the processor, wherein the processor executes the computer program to:

receive a first indication; and perform a first operation based on the first indication, wherein the first operation comprises one of the following:

if it is determined, based on the first indication, that measurement needs to be performed, performing measurement on a measurement object to obtain a measurement result;

if it is determined, based on the first indication, that no measurement needs to be performed, skipping performing measurement;

determining a measurement object based on the first indication, and performing measurement on the measurement object to obtain a measurement result; or if it is determined, based on the first indication, that measurement needs to be performed, determining a measurement object based on the first indication, and performing measurement on the measurement object to obtain a measurement result;

wherein the first indication comprises a threshold, and the threshold comprises at least one of the following:

a first threshold;

a second threshold;

a third threshold; or a fourth threshold; and the processor executes the computer program to: determine that measurement needs to be performed if at least one of the following conditions is met:

measured performance of a camped cell is less than the first threshold;

or measured performance of a band of the camped cell is less than the third threshold.

19. The terminal according to claim 18, wherein that it is determined, based on the first indication, that measurement needs to be performed comprises: determining that measurement needs to be performed if the following condition is met:

measured performance of a carrier of the camped cell is less than the second threshold;

measured performance of a current BWP is less than the fourth threshold;

wherein the measured performance comprises at least one of the following:

signal to interference plus noise ratio;

channel state information;

channel quality indicator;

layer 1 measurement results;

layer 2 measurement results; or layer 3 measurement results.

20. A non-transitory computer-readable storage medium, wherein a computer program is stored in the computer-readable storage medium, and the computer program, when executed by a processor, implements the steps of the processing method for terminal measurement according to claim 1.

* * * * *